United States Patent
Patočka

(10) Patent No.: US 9,715,351 B2
(45) Date of Patent: Jul. 25, 2017

(54) COPY-OFFLOAD ON A DEVICE STACK

(71) Applicant: Red Hat, Inc., Raleigh, NC (US)

(72) Inventor: Mikuláš Patočka, Prague (CZ)

(73) Assignee: Red Hat, Inc., Raleigh, NC (US)

( * ) Notice: Subject to any disclaimer, the term of this patent is extended or adjusted under 35 U.S.C. 154(b) by 63 days.

(21) Appl. No.: 14/622,754

(22) Filed: Feb. 13, 2015

(65) Prior Publication Data

US 2016/0239210 A1  Aug. 18, 2016

(51) Int. Cl.
*G06F 3/06* (2006.01)
*G06F 11/07* (2006.01)

(52) U.S. Cl.
CPC .......... *G06F 3/065* (2013.01); *G06F 3/0619* (2013.01); *G06F 3/0683* (2013.01); *G06F 11/0727* (2013.01); *G06F 11/0787* (2013.01)

(58) Field of Classification Search
CPC .... G06F 3/065; G06F 11/0727; G06F 3/0619; G06F 11/0787; G06F 3/0683
See application file for complete search history.

(56) References Cited

U.S. PATENT DOCUMENTS

| | | | | |
|---|---|---|---|---|
| 6,401,223 B1* | 6/2002 | DePenning | ........... | G06F 9/5011 711/112 |
| 6,457,109 B1* | 9/2002 | Milillo | ........... | G06F 3/0605 711/161 |
| 6,587,962 B1* | 7/2003 | Hepner | ........... | G06F 11/004 714/19 |
| 8,566,502 B2 | 10/2013 | Vaghani | | |
| 8,725,692 B1 | 5/2014 | Natanzon et al. | | |
| 8,745,336 B2 | 6/2014 | Vaghani | | |
| 9,164,913 B1* | 10/2015 | Tawri | ........... | G06F 12/0866 |
| 2010/0186014 A1 | 7/2010 | Vaghani et al. | | |
| 2011/0197022 A1* | 8/2011 | Green | ........... | G06F 3/0607 711/112 |
| 2012/0079583 A1 | 3/2012 | Christiansen et al. | | |
| 2013/0179649 A1 | 7/2013 | Green et al. | | |

(Continued)

OTHER PUBLICATIONS

No Author, "VMAX and vSphere VAAI XCOPY Update!" Virtual Geek, Dec. 18, 2012, 5 pages, Internet: <http://virtualgeek.typepad.com/virtual_geek/2012/12/vmax-and-vsphere-vaai-xcopy-update.html>.

(Continued)

*Primary Examiner* — Arpan P. Savla
(74) *Attorney, Agent, or Firm* — Lowenstein Sandler LLP

(57) ABSTRACT

A read request, a write request, and copy descriptor are constructed and sent to logical volumes of a device stack to complete a copy-offload operation between a source logical volume and a destination logical volume. The read request is forwarded to a source physical volume of a device stack and a write request is forwarded to a destination physical volume of the device stack. Responsive to detecting that the read request has been received by the source physical volume of the device stack and the write request has been received by a destination physical volume of the device stack, the driver of the source physical volume or the driver of the destination physical volume construct a copy-offload request to be sent to a storage device, the copy-offload request comprising the read request, the write request, and the copy descriptor. The copy-offload request is subsequently sent to the storage device.

16 Claims, 4 Drawing Sheets

(56) References Cited

U.S. PATENT DOCUMENTS

| | | | |
|---|---|---|---|
| 2014/0068213 A1* | 3/2014 | Maeda | G06F 3/0608 |
| | | | 711/162 |
| 2014/0074782 A1 | 3/2014 | Green et al. | |
| 2014/0122434 A1* | 5/2014 | Knight | G06F 3/0608 |
| | | | 707/645 |
| 2014/0164571 A1 | 6/2014 | Green | |
| 2014/0195755 A1* | 7/2014 | Colgrove | G06F 3/0619 |
| | | | 711/162 |
| 2015/0363125 A1* | 12/2015 | Vijayakumari Rajendran Nair | G06F 3/0619 |
| | | | 711/162 |
| 2015/0363480 A1* | 12/2015 | Vijayakumari Rajendran Nair | G06F 17/30581 |
| | | | 707/622 |
| 2015/0370492 A1* | 12/2015 | Satnur | G06F 3/0614 |
| | | | 711/114 |

OTHER PUBLICATIONS

Chris Fraser, "XCOPY and VAAI Issues with Flare 05.32.000.5.207," EMC Community Network, Sep. 19, 2013, 2 pages, Internet: <https://community.emc.com/thread/181637>.

No Author, "Hypervisor Storage Interfaces for Storage Optimization White Paper," SNIA Copy Offload Hypervisor Storage Interfaces, Jun. 2010, 5 pages, Internet: <http://www.snia.org/sites/default/files/HSI_Copy_Offload_WP-r12.pdf>.

* cited by examiner

COPY-OFFLOAD ON A DEVICE STACK

TECHNICAL FIELD

The present disclosure is generally related to computer systems, and more particularly, to implementing copy-offload on a device stack of a computer system.

BACKGROUND

Typical copy operations are completed on a computer system by reading data from a source storage volume, buffering it, and writing it to a destination storage volume. Copy-offload is a feature that allows file systems or storage devices to be instructed to copy files without transferring large amounts of data across a network connection or requiring involvement of the local CPU. Copy-offload can speed up copy operations by allowing them to be performed by the storage hardware, rather than buffering data by the operating system, which can cut down on CPU cycles and network traffic.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
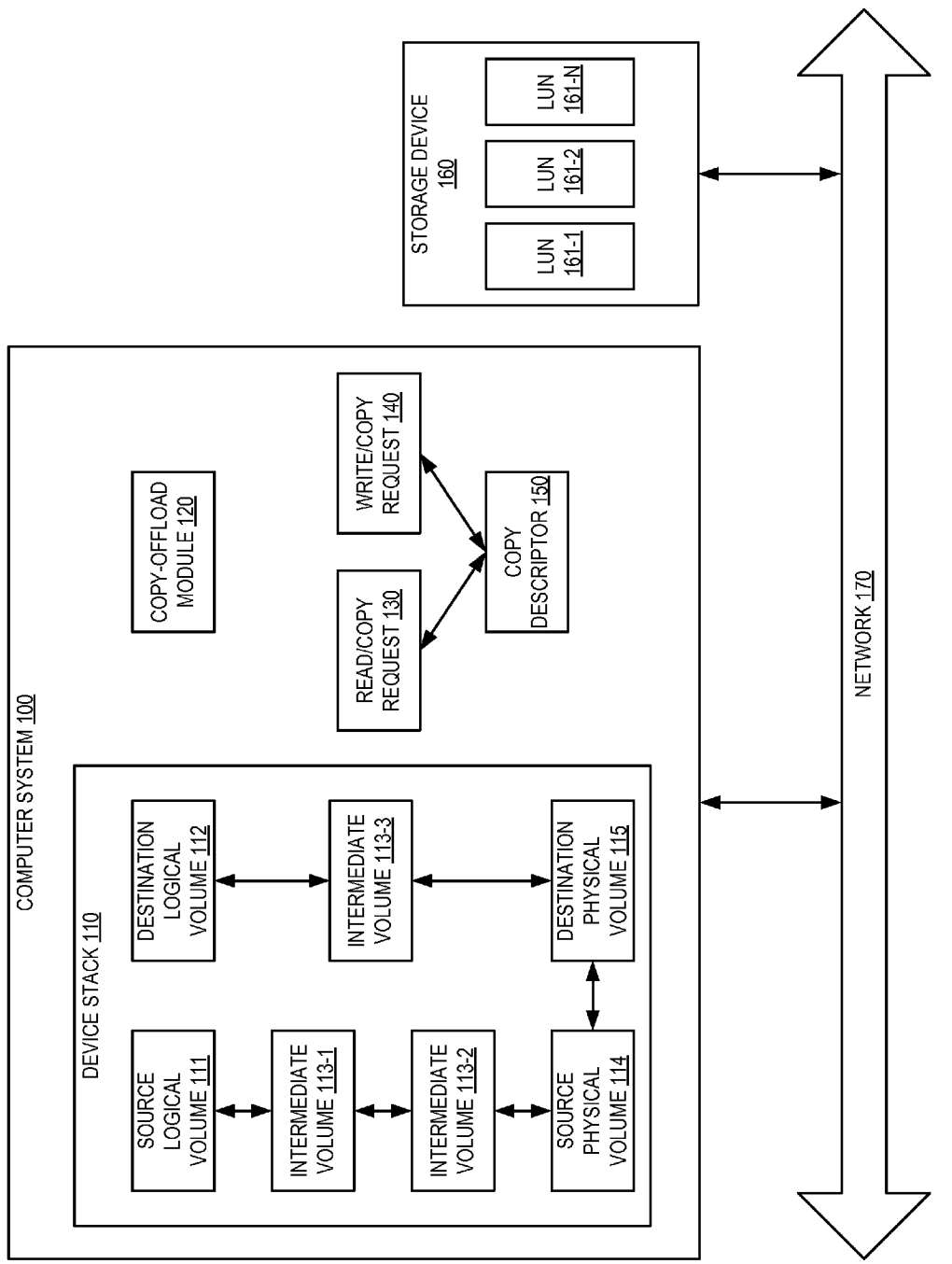
FIG. 1 depicts a high-level component diagram of an example computer system architecture, in accordance with one or more aspects of the present disclosure.

Copy-offload can speed up copy operations by allowing them to be performed by the storage hardware, rather than buffering data by the operating system, which can cut down on CPU cycles and network traffic. Advanced storage arrays supporting copy-offload may receive a copy-offload command with a list of descriptors that permit the storage hardware to locate the applicable sectors of the storage device and complete the copy operation without transferring data through the network as would may be completed by reading then writing the data). However, copy-offload is typically not available in systems implementing a device stack. A device stack is a directed acyclic graph of storage volumes. At the "bottom" of the device stack are physical volumes that are each mapped to a corresponding logical unit of a storage device. At the "top" of the device stack are logical volumes that interface with file systems, database systems, or application programs. The device stack may be arbitrarily deep, including one or more intermediate volumes between the physical volumes and the logical volumes that can add layers of abstraction to a computer system. When a file system needs to perform an I/O operation on a logical volume, it can send a request to the topmost layer of the device stack. The volume driver may perform an operation on behalf of the requestor or it may send the request to a lower volume in the device stack. When a request goes through each layers of the device stack and reaches the physical volume, it is sent over the network to the storage device. When the storage device replies, the physical volume receives the reply and returns it through the intermediate volumes of the device stack to the logical volume, and subsequently to the file system or program that issued the I/O request.

Read requests and write requests are typically implemented on a device stack to operate independently since there can be an arbitrary number of layers between the logical volume and physical volume. This can provide performance benefits since multiple requests can be submitted asynchronously. However, independent read and write operations require large amounts of data to be transferred across the network to implement complete a copy operation.

Aspects of the present disclosure address the above noted deficiency by implementing modified read and write requests (read/copy and write/copy requests) that can be linked together at each layer of a device stack in order to provide copy-offload functionality. In an illustrative example, a copy-offload component of a computer system may receive a request to copy data from a source logical volume of a device stack to a destination logical volume of the device stack. The copy-offload component of the computer system may be a component of an operating system (e.g., a component of the Linux kernel). A device stack may comprise one or more logical volumes, one or more physical volumes, and one or more intermediate volumes. In certain implementations, the request may be received by a component of an operating system (e.g., the kernel of a Linux operating system) from an application program. Alternatively, the request may be received by one component of the operating system from another component of the operating system (e.g., to complete the copying required for data mirroring in RAID arrays).

Upon receipt of the copy request, the copy-offload component may then construct a read/copy request to be sent to the source logical volume and a write/copy request to be sent to the destination logical volume. Each read/copy or write/copy request may comprise a data structure in shared memory accessible to the operating system that stores information necessary to complete the copy-offload operation. For example, the data structure for each request may comprise the type of request (e.g., read or write), an identification of the volume on which the I/O operation should be performed, a sector number where the I/O should be performed, a number of sectors that should be copied, a pointer to a copy descriptor, an error code indicating success or failure, etc.

The copy-offload component may construct the copy descriptor and associate it with the read/copy request and the write/copy request to maintain a link between the two requests as they are forwarded separately through the device stack. The copy descriptor may comprise a data structure in shared memory accessible to the operating system. For example, the data structure may comprise a reference count (e.g., the number of requests in flight that point to this particular descriptor), a pointer to the data structure storing the initial read/copy request associated with the descriptor, a pointer to the data structure storing the initial write/copy request associated with the descriptor, an error code, a spin lock that protects the descriptor from concurrent updates, a timer that can cause the copy-offload request to be terminated after a predetermined period of time, etc.

The copy-offload component may then send the read/copy request to the source logical volume and the write/copy request to the destination logical volume. Subsequently, the copy-offload component may cause the read/copy request to be forwarded by the operating system (e.g., the Linux kernel) to a source physical volume of the device stack and the write/copy request to be forwarded by the operating system to a destination physical volume of the device stack. To forward each request to its intended physical volume, the copy-offload component may cause (e.g., via another component of the Linux kernel) the device driver of each logical volume to determine if an intermediate volume is present that associates the logical volume with the physical volume. Upon detecting that an intermediate volume is present, the copy-offload component may cause (e.g., via another component of the Linux kernel) the device driver of the logical volume to create an intermediate request to send to the intermediate volume.

For example, if an intermediate volume is detected that associates the source logical volume with the source physical volume, the copy-offload component may cause (e.g., via another component of the Linux kernel) the device driver of the source logical volume to use the information received in the read/copy request to construct a new intermediate read/copy request that can be sent to the intermediate volume. Similarly, if an intermediate volume is detected that associates the destination logical volume with the destination physical volume, the copy-offload component may cause (e.g., via another component of the Linux kernel) the device driver of the destination logical volume to use the information received in the write/copy request to construct a new intermediate write/copy request that can be sent to the intermediate volume. The copy descriptor created at the start of the process can be retained, and associated with any intermediate read or write/copy request subsequently created for the corresponding intermediate volume. In some implementations, the reference count of the copy descriptor can be incremented when the copy descriptor is created at the start of the process and decremented upon termination of one of the requests. For example, the reference count may be '0' when there are no requests in flight, '1' when one of either the read/copy request or the right/copy request are in flight, and '2' when both the read/copy request and the right/copy request are in flight. Alternatively, the reference count of the copy descriptor may be incremented at each intermediate volume and decremented when each request subsequently completes.

The process for intermediate volumes can be repeated for each intermediate volume present in the device stack that associates a logical volume with a corresponding physical volume. Thus, if multiple levels of intermediate volumes exist in the device stack, the copy-offload component can cause the device driver at each intermediate volume to create new read or write/copy requests and send them to any associated additional intermediate volume. At each level, while a new read or write/copy request can be created, the copy descriptor may remain the same across all levels of the device stack.

If a read/copy or write/copy request fails at any one of the intermediate volumes, the copy-offload component may cause the device driver at that intermediate volume to terminate the corresponding write or read/copy request. For example, when a write/copy request is received by the device driver of an intermediate volume, prior to forwarding the request to the next level of the device stack it may check the copy descriptor to determine if the associated read/copy request is still active. Alternatively, the device driver may use the error field in the copy descriptor to determine the status of the read/copy request. Responsive to determining that the read/copy request has failed, the device driver of the intermediate volume handling the write/copy request may terminate the write/copy request.

Similarly, when a read/copy request is received by the device driver of an intermediate volume, prior to forwarding the request to the next level of the device stack, it may check the copy descriptor to determine if the associated write/copy request is still active. Alternatively, the device driver may use the error field in the copy descriptor to determine the status of the write/copy request. Responsive to determining that the write/copy request has failed, the device driver of the intermediate volume handling the read/copy request may terminate the read/copy request.

Once the read/copy request has been received by the source physical volume and the write/copy request has been received by the destination physical volume, the copy-offload component can cause the device driver of one of the source physical volume or the destination physical volume to construct a copy-offload request to be sent to a storage device coupled to the computer system. In some implementations, the storage device may comprise a Small Computer System Interface (SCSI) storage device and the copy-offload request may comprise a SCSI extended copy command. The copy-offload request may comprise information from the read/copy request received by the source physical volume, the write/copy request from the destination physical volume, and the copy descriptor associated with the two requests.

In one illustrative example, the physical volume that receives the corresponding request last may construct and send the copy-offload request to the storage device. Thus, if the read/copy request is received by the source physical volume before the write/copy request is received by the destination physical volume, the copy-offload component can cause the device driver of the source physical volume to determine whether the corresponding write/copy request has been received by the destination physical volume. In some implementations, the device driver may accomplish this by checking the copy descriptor for the appropriate status code. If the device driver of the source physical volume determines that the destination physical volume has not yet received the write/copy request, the device driver may defer constructing and sending the copy-offload request. Once the destination physical volume receives the write/copy request, the copy-offload component can cause the device driver of the destination physical volume to construct and send the copy-offload request to the intended storage device.

Alternatively, the device driver of a particular physical volume may send the copy-offload request to the storage device regardless of the order in which the requests are received. For example, the device driver of the destination physical volume (e.g., the physical volume receiving the write/copy request) may send the request. If the read/copy request is received at the source physical volume before the write/copy request is received at the destination physical volume, processing may occur as detailed in the previous example. However, if the write/copy request is received by the destination physical volume before the read/copy request is received by the source physical volume, the copy-offload component can cause the device driver of the destination physical volume to defer constructing and sending the copy-offload request. Once the source physical volume receives the read/copy request, the copy-offload component can cause the device driver of the source physical volume to notify the device driver of destination physical volume that the read/copy request has been received. The device driver of the destination physical volume can then construct and send the copy-offload request to the intended storage device.

Subsequently, the storage device can execute the copy-offload request and notify the device driver that submitted the request of the results. Responsive to the execution of the copy-offload command by the storage device, the copy-offload component can cause the device driver of the appropriate physical volume to receive an error code from the storage device indicating success or failure. For example, a SCSI storage device can return a SCSI sense code to the device driver. A SCSI sense code can comprise error reporting information received from a SCSI interface. In some implementations, a SCSI sense code can report an error code as well as additional information to assist in locating the source of an encountered error with a I/O operation. For example, a SCSI sense code can comprise a type, a related command, and an additional sense code (ASCQ). The device driver can then translate the sense code to an error code (e.g., an integer value specific to the operating system), update the copy descriptor with the translated error code, and return the error code to the source logical volume and the destination logical volume. In implementations where intermediate volumes associate the logical volume to the physical volume, the error code can be returned back through the device stack to each intermediate volume between the physical volume and the logical volume. In implementations where the reference count in the copy descriptor is maintained at each intermediate volume, it can be decremented when a request completes at each intermediate volume as the requests pass back through the device stack between the physical volumes and the logical volumes. When each request reaches the originating logical volumes, the reference count may be decremented. When the reference count drops to zero, both initial requests may be considered complete.

If the storage device fails to complete the copy-offload request successfully (e.g. if there is a problem writing one of the destination sectors, etc.) and returns an error code, the copy-offload component may cause the device driver of the requesting physical volume to reject additional copy-offload requests from the source physical volume to the destination physical volume for a predetermined period of time. The device driver may store this information in a shared memory space accessible to the operating system, to a storage device, or in any similar manner.

Aspects of the present disclosure are thus capable of providing copy-offload functionality to computer systems implementing a device stack. More particularly, aspects of the present disclosure can improve the performance of storage devices accessible via a device stack by reducing network traffic involved in copying data between units of the storage device.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is coupled to one or more storage devices 160 (e.g., one or more magnetic hard disk drives, a Small Computer System Interface (SCSI) storage array, a Peripheral Component Interconnect [PCI] solid state drive, a Redundant Array of Independent Disks [RAID] system, a network attached storage [NAS] array, etc.) over a network 170. The computer system 100 may be a server, a mainframe, a workstation, a personal computer (PC), a mobile phone, a palm-sized computing device, or any other computing devices capable of running one or more operating systems (Microsoft Windows, Linux, Solaris, Mac OS, etc.) that may support a device stack. The network 150 may be a private network (e.g., a local area network (LAN), a wide area network (WAN), intranet, etc.) or a public network (e.g., the Internet). Computer system 100 may comprise one or more device stack 110, copy-offload module 120, read/copy request 130, write/copy request 140, and copy descriptor 150.

Device stack 110 may be a directed acyclic graph of storage volumes, comprising source logical volume 111, destination logical volumes 112, one or more intermediate volumes 113-1 through 113-3, source physical volume 114, and destination physical volume 115. Source logical volume 111 may be associated with source physical volume 114 via two intermediate volumes 113-1 and 113-2 in the device stack. Destination logical volume 112 may be associated with destination physical volume 115 via a single intermediate volume 113-3. It should be noted that although, for simplicity, a single configuration is depicted, device stack 110 may comprise a variety of alternative layers between the logical volume and physical volume layers. Similarly, although a single source logical volume 111, destination logical volume 112, source physical volume 114, and destination physical volume 115 are depicted in FIG. 1, devices stack 110 may comprise a plurality of each.

Copy-offload module 120 can receive requests to copy data from source logical volume 111 to destination logical volume 112, construct the necessary read/copy and write/copy requests and forward the requests through the device stack as described in detail below with respect to FIGS. 2 and 3. Copy-offload module may additionally cause the device drivers of the physical volumes to use the read/copy request 130, write/copy request 140, and copy descriptor 150 data structures to construct a copy-offload request to be forwarded to the storage device.

Read/copy request 130, write/copy request 140, and copy descriptor 150 may be data structures created by copy-offload module 120 and forwarded through devices stack 110 to complete the copy-offload operation. It should be noted that although, for simplicity, a single read/copy request 130, right/copy request 140, and copy descriptor 150 are depicted in FIG. 1, computer system 100 may comprise a plurality of each. Each of read/copy request 130, write/copy request 140, and copy descriptor 150 may be stored in a memory space accessible to copy-offload module as well as the device drivers of each level of device stack 110.

Storage device 160 may comprise one or more logical units (LUNs) 161-1 through 161-N where N is a positive integer. Each LUN 161 may be an independent unit within the storage device. Each physical volume within device stack 110 can be mapped to an LUN 161 of the storage device 160. It should be noted that although, for simplicity, a single storage device 160 is depicted in FIG. 1, in some other embodiments computer system 100 may comprise a plurality of storage devices. In an illustrative example, copy offload module 120 may perform the copy operations described in detail below with respect to FIGS. 2 and 3 between different storage devices 160 attached to the same network.

Figure 2:
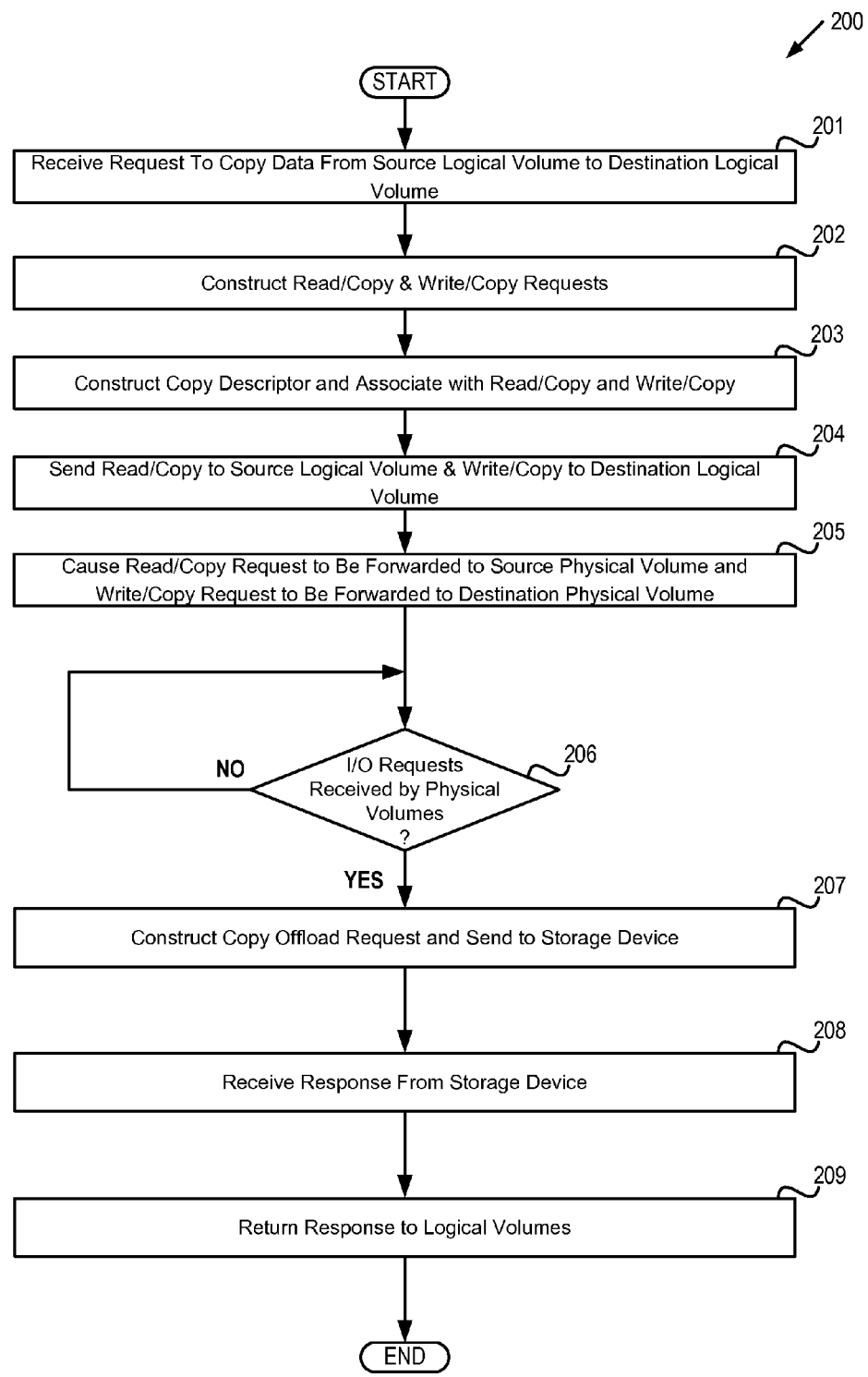
FIG. 2 depicts a flow diagram of a method for implementing a copy-offload request in a device stack, in accordance with one or more aspects of the present disclosure.

FIG. 2 depicts a flow diagram of an example method 200 for implementing a copy-offload request in a device stack. The method may be performed by processing logic that may comprise hardware (circuitry, dedicated logic, etc.), software (such as is run on a general purpose computer system or a dedicated machine), or a combination of both. In one illustrative example, method 200 may be performed by copy-offload module 120 in FIG. 1. Alternatively, some or all of method 200 might be performed by another machine. It should be noted that blocks depicted in FIG. 2 could be performed simultaneously or in a different order than that depicted.

At block 201, processing logic receives a request to copy data from a source logical volume to a destination logical volume of a device stack. In certain implementations, the request may be received by a component of an operating system (e.g., the kernel of a Linux operating system) from an application program. Alternatively, the request may be received by one component of the operating system from another component of the operating system (e.g., to complete the copying required for data mirroring in RAID arrays).

At block 202, processing logic constructs a read/copy request and a write/copy request. Each read/copy or write/copy request may comprise a data structure in shared memory accessible to the operating system that stores information necessary to complete the copy-offload operation. For example, the data structure for each request may comprise the type of request (e.g., read or write), an identification of the volume on which the I/O operation should be performed, a sector number where the I/O should be performed, a number of sectors that should be copied, a pointer to a copy descriptor, an error code indicating success or failure, etc.

At block 203, processing logic constructs a copy descriptor and associates it with the read/copy request and write/copy request constructed at block 202. The copy descriptor may comprise a data structure in shared memory accessible to the operating system. For example, the data structure may comprise a reference count (e.g., the number of requests in flight that point to this particular descriptor), a pointer to the data structure storing the initial read/copy request associated with the descriptor, a pointer to the data structure storing the initial write/copy request associated with the descriptor, an error code, a spin lock that protects the descriptor from concurrent updates, a timer that can cause the copy-offload request to be terminated after a predetermined period of time, etc.

At block 204, processing logic sends the read/copy request to the source logical volume and the write/copy request to the destination logical volume. At block 205, processing logic causes the read/copy request to be forwarded to the source physical volume and the write/copy request to be forwarded to the destination physical volume. To forward each request to its intended physical volume, processing logic may cause the device driver of each logical volume to determine if an intermediate volume is present that associates the logical volume with the physical volume. Upon detecting that an intermediate volume is present, processing logic may cause the device driver of the logical volume to create an intermediate request to send to the intermediate volume.

At block 206, processing logic determines whether the read/copy request has been received by the source physical volume and the write/copy request has been received at the destination physical volume. If so, execution proceeds to block 207. Otherwise, execution returns to block 206. At block 207, processing logic causes the device driver of one of the physical volumes to construct a copy-offload request and send it to a storage device. In some implementations, if the read/copy request is received by the source physical volume before the write/copy request is received by the destination physical volume, processing logic can cause the device driver of the source physical volume defer constructing and sending copy-offload request. Once the destination physical volume receives the write/copy request, processing logic can cause the device driver of the destination physical volume to construct and send the copy-offload request to the intended storage device At block 208, processing logic can cause the device driver of the physical volume to receive a response from the storage device. For example, a SCSI storage device can return a SCSI sense code to the device driver. A SCSI sense code can comprise error reporting information received from a SCSI interface. In some implementations, a SCSI sense code can report an error code as well as additional information to assist in locating the source of an encountered error with a I/O operation. For example, a SCSI sense code can comprise a type, a related command, and an additional sense code (ASCQ). The device driver can then translate the sense code to an error code (e.g., an integer value specific to the operating system) and update the copy descriptor with the translated error code. At block 209, processing logic returns the response to the logical volumes. In implementations where intermediate volumes associate the logical volume to the physical volume, the error code can be returned back through the device stack to each intermediate volume between the physical volume and the logical volume. After block 209, the method of FIG. 2 terminates.

Figure 3:
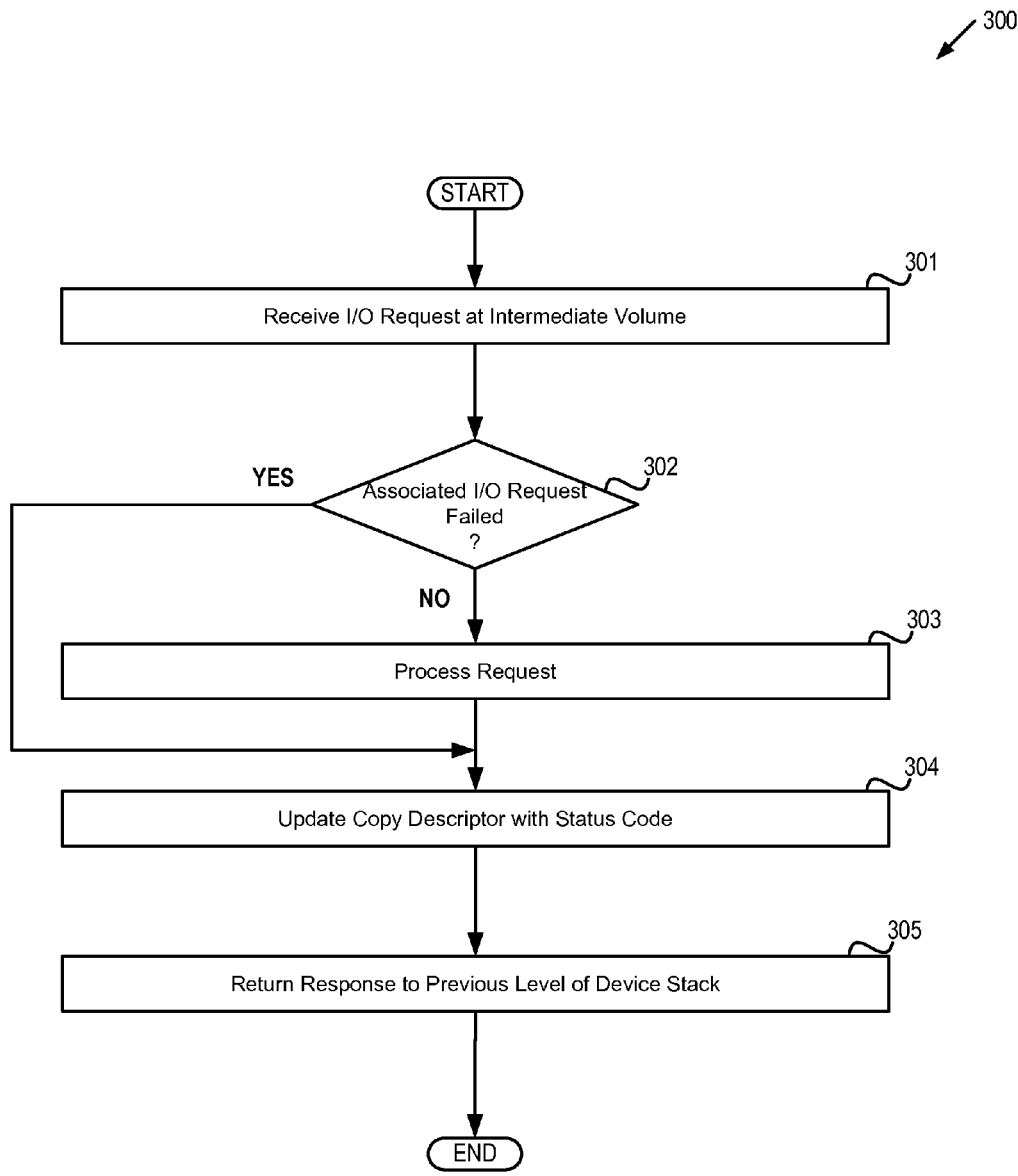
FIG. 3 depicts a flow diagram of a method for handling an I/O request at an intermediate volume in a device stack, in accordance with one or more aspects of the present disclosure.

FIG. 3 depicts a flow diagram of an example method 300 for handling an I/O request at an intermediate volume in a device stack. The method may be performed by processing logic that may comprise hardware (circuitry, dedicated logic, etc.), software (such as is run on a general purpose computer system or a dedicated machine), or a combination of both. In one illustrative example, method 300 may be performed by copy-offload module 120 in FIG. 1. Alternatively, some or all of method 300 might be performed by another machine. It should be noted that blocks depicted in FIG. 3 could be performed simultaneously or in a different order than that depicted.

At block 301, processing logic receives an I/O request at an intermediate volume. An I/O request can comprise a read/copy request or a write/copy request. At block 302, processing logic determines whether the associated I/O request failed. If so, execution proceeds to block 304. Otherwise, execution continues to block 303. If a read/copy request was received at block 301, processing logic can determine whether the corresponding write/copy request failed. Conversely, if a write/copy request was received at block 301, processing logic can determine whether the corresponding read/copy request failed. In some implementations, processing logic may check the copy descriptor to determine if the associated I/O request failed. Alternatively, processing logic may use the pointer in the copy descriptor to read the data structure storing the error code for the associated I/O request.

At block 303, processing logic processes the I/O request at the intermediate volume. Processing logic can determine if there is an additional intermediate volume in the device stack, and if so, construct a corresponding request to be forwarded to that volume. Similarly, if processing logic determines that the next level of the device stack is the intended physical volume, processing logic will construct the request to be forwarded to the physical volume. Processing logic can increment the reference count in the copy descriptor and associate the copy descriptor with the new I/O request. Processing logic may then forward the new request to the next volume in the device stack and subsequently receive a response.

At block 304, processing logic updates the copy descriptor associated with the request with the appropriate status code received in the response at block 303. Processing logic may also decrement the reference count prior to returning the response to the previous level of the device stack. At block 305, processing logic returns the response to the previous level of the device stack. After block 305, the method of FIG. 3 terminates.

Figure 4:
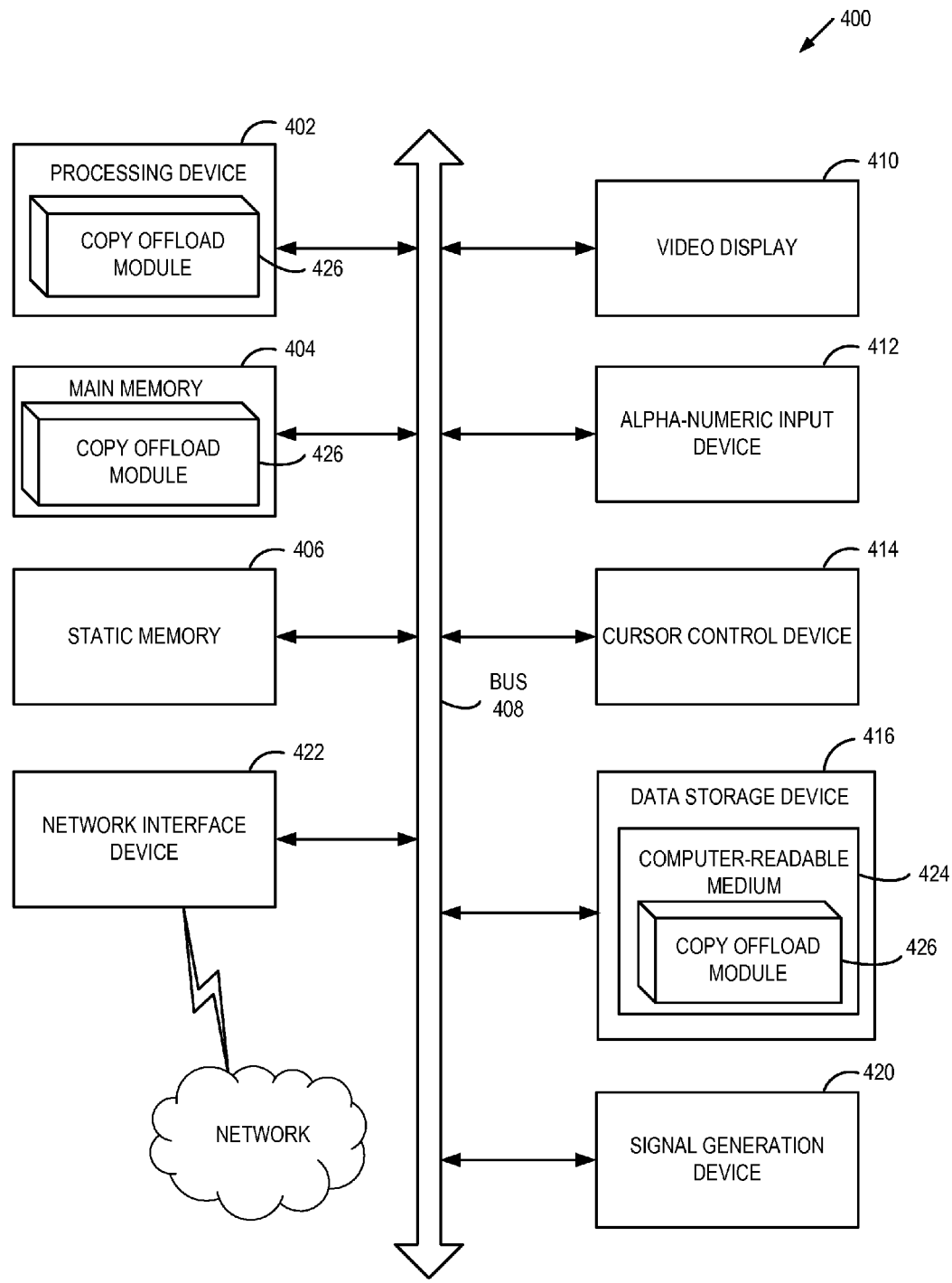
FIG. 4 depicts a block diagram of an illustrative computer system operating in accordance with examples of the invention.

FIG. 4 depicts an example computer system 400 which can perform any one or more of the methods described herein. In one example, computer system 400 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 400 includes a processing device 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute copy-offload module 426 for performing the operations and steps discussed herein (e.g., corresponding to the methods of FIGS. 2-3, etc.).

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker). In one illustrative example, the video display unit 410, the alphanumeric input device 412, and the cursor control device 414 may be combined into a single component or device (e.g., an LCD touch screen).

The data storage device 416 may include a computer-readable medium 624 on which is stored copy-offload module 426 (e.g., corresponding to the methods of FIGS. 2-3, etc.) embodying any one or more of the methodologies or functions described herein. Copy-offload module 426 may also reside, completely or at least partially, within the main memory 404 and/or within the processing device 402 during execution thereof by the computer system 600, the main memory 404 and the processing device 402 also constituting computer-readable media. Copy-offload module 426 may further be transmitted or received over a network via the network interface device 422.

While the computer-readable storage medium 424 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "constructing," "associating," "sending," "causing," "detecting," "returning," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving, by a processing device, a request to copy data from a source logical volume of a device stack to a destination logical volume of the device stack, wherein the device stack comprises a source intermediate volume that associates the source logical volume with a source physical volume, and a destination intermediate volume that associates the destination logical volume with a destination physical volume;
   constructing, by the processing device, a read request to be sent to the source logical volume to read the data and a write request to be sent to the destination logical volume to write the data;
   constructing, by the processing device, a copy descriptor to be associated with the read request and the write request;
   associating, by the processing device, the copy descriptor with the read request and the write request;
   sending, by the processing device, the read request to the source logical volume and the write request to the destination logical volume;
   causing, by the processing device, the read request to be forwarded to the source physical volume of the device stack and the write request to be forwarded to the destination physical volume of the device stack;
   responsive to determining that the read request has failed at the source intermediate volume of the device stack, causing a driver of the source intermediate volume to terminate the write request;
   responsive to determining that the write request has failed at the destination intermediate volume of the device stack, causing a driver of the destination intermediate volume to terminate the read request;
   responsive to detecting that the read request has been received by the source physical volume of the device stack and the write request has been received by a destination physical volume of the device stack, causing one of a driver of the source physical volume or a driver of the destination physical volume to construct a copy-offload request to be sent to a storage device, the copy-offload request comprising the read request, the write request, and the copy descriptor; and
   sending the copy-offload request to the storage device.

2. The method of claim 1 further comprising:
   responsive to execution of the copy-offload request by the storage device, receiving a sense code from the storage device;
   translating the sense code to an error code;
   updating the descriptor with the error code; and
   returning the error code to the source logical volume and the destination logical volume.

3. The method of claim 1 wherein causing the read request to be forwarded to the source physical volume comprises:
   responsive to detecting that the device stack comprises one or more intermediate volumes that associate the source logical volume with the source physical volume, constructing an intermediate read request to be sent to each of the one or more intermediate volumes;
   sending the intermediate read request to each of the one or more intermediate volumes.

4. The method of claim 3 wherein causing the write request to be forwarded to the destination physical volume comprises:

responsive to detecting that the device stack comprises one or more intermediate volumes that associate the destination logical volume with the destination physical volume, constructing an intermediate write request to be sent to each of the one or more intermediate volumes; and sending the intermediate write request to each of the one or more intermediate volumes.

5. The method of claim 2 further comprising:

responsive to determining that the copy-offload request has failed, causing one of the driver of the source physical volume or the driver of the destination physical volume to reject additional copy requests from the source physical volume to the destination physical volume for a predetermined period of time.

6. A computing apparatus comprising:

a memory; and a processing device, operatively coupled to the memory to:

cause, by the processing device, a read request to be forwarded to a source physical volume of a device stack and a write request to be forwarded to a destination physical volume of the device stack, wherein the device stack comprises a source intermediate volume that associates a source logical volume with the source physical volume, and a destination intermediate volume that associates a destination logical volume with the destination physical volume;

construct a copy descriptor to be associated with the read request and the write request;

associate the copy descriptor with the read request and the write request;

responsive to determining that the read request has failed at the source intermediate volume of the device stack, cause the driver of the source intermediate volume to terminate the write request;

responsive to determining that the write request has failed at the destination intermediate volume of the device stack, cause the driver of the destination intermediate volume to terminate the read request;

responsive to detecting that the read request has been received by the source physical volume of the device stack and the write request has been received by a destination physical volume of the device stack, cause one of a driver of the source physical volume or a driver of the destination physical volume to construct a copy-offload request to be sent to a storage device, the copy-offload request comprising the read request, the write request, and the copy descriptor; and send the copy-offload request to the storage device.

7. The apparatus of claim 6, wherein the processing device is further to:

construct the read request to be sent to the source logical volume and the write request to be sent to the destination logical volume; and send the read request to the source logical volume and the write request to the destination logical volume.

8. The apparatus of claim 7, wherein the processing device is further to:

responsive to execution of the copy-offload request by the storage device, receive a sense code from the storage device;

translate the sense code to an error code;

update the descriptor with the error code; and return the error code to the source logical volume and the destination logical volume.

9. The apparatus of claim 7 wherein to cause the read request to be forwarded to the source physical volume, the processing device is to:

responsive to detecting that the device stack comprises one or more intermediate volumes that associate the source logical volume with the source physical volume, construct an intermediate read request to be sent to each of the one or more intermediate volumes;

send the intermediate read request to each of the one or more intermediate volumes.

10. The apparatus of claim 9 wherein to cause the write request to be forwarded to the destination physical volume, the processing device is to:

responsive to detecting that the device stack comprises one or more intermediate volumes that associate the destination logical volume with the destination physical volume, construct an intermediate write request to be sent to each of the one or more intermediate volumes; and send the intermediate write request to each of the one or more intermediate volumes.

11. The apparatus of claim 8, wherein the processing device is further to:

responsive to determining that the copy-offload request has failed, cause one of the driver of the source physical volume or the driver of the destination physical volume to reject additional copy requests from the source physical volume to the destination physical volume for a predetermined period of time.

12. A non-transitory computer readable storage medium, having instructions stored therein, which when executed by a processing device, cause the processing device to:

receive, by the processing device, a request to copy data from a source logical volume of a device stack to a destination logical volume of the device stack, wherein the device stack comprises a source intermediate volume that associates the source logical volume with a source physical volume, and a destination intermediate volume that associates the destination logical volume with a destination physical volume;

construct, by the processing device, a read request to be sent to the source logical volume and a write request to be sent to the destination logical volume;

construct, by the processing device, a copy descriptor to be associated with the read request and the write request;

associate, by the processing device, the copy descriptor with the read request and the write request;

send, by the processing device, the read request to the source logical volume and the write request to the destination logical volume;

cause, by the processing device, the read request to be forwarded to the source physical volume of the device stack and the write request to be forwarded to the destination physical volume of the device stack;

responsive to determining that the read request has failed at the source intermediate volume of the device stack, cause the driver of the source intermediate volume to terminate the write request;

responsive to determining that the write request has failed at the destination intermediate volume of the device stack, cause the driver of the destination intermediate volume to terminate the read request;

responsive to detecting that the read request has been received by the source physical volume of the device stack and the write request has been received by a destination physical volume of the device stack, cause one of a driver of the source physical volume or a driver of the destination physical volume to construct a copy-offload request to be sent to a storage device, the copy-offload request comprising the read request, the write request, and the copy descriptor; and send the copy-offload request to the storage device.

13. The non-transitory computer readable storage medium of claim 12, wherein the processing device is further to:

responsive to the execution of the copy-offload request by the storage device, receive a sense code from the storage device;

translate the sense code to an error code;

update the descriptor with the error code; and return the error code to the source logical volume and the destination logical volume.

14. The non-transitory computer readable storage medium of claim 12, wherein to cause the read request to be forwarded to the source physical volume, the processing device is to:

responsive to detecting that the device stack comprises one or more intermediate volumes that associate the source logical volume with the source physical volume, construct an intermediate read request to be sent to each of the one or more intermediate volumes; and send the intermediate read request to each of the one or more intermediate volumes.

15. The non-transitory computer readable storage medium of claim 14, wherein to cause the write request to be forwarded to the destination physical volume, the processing device is to:

responsive to detecting that the device stack comprises one or more intermediate volumes that associate the destination logical volume with the destination physical volume, construct an intermediate write request to be sent to each of the one or more intermediate volumes; and send the intermediate write request to each of the one or more intermediate volumes.

16. The non-transitory computer readable storage medium of claim 13, wherein the processing device is further to:

responsive to determining that the copy-offload request has failed, cause one of the driver of the source physical volume or the driver of the destination physical volume to reject additional copy requests from the source physical volume to the destination physical volume for a predetermined period of time.

* * * * *